United States Patent
Rose

[19]

[11] Patent Number: 6,032,405
[45] Date of Patent: Mar. 7, 2000

[54] ANIMAL FOOT TRAP

[76] Inventor: Hugh Quentin Rose, Hammerton Court, High Street, Tewkesbury, Gloucestershire, Gl20 5BN, United Kingdom

[21] Appl. No.: 09/043,168

[22] PCT Filed: Sep. 20, 1996

[86] PCT No.: PCT/GB96/02330

§ 371 Date: Mar. 12, 1998

§ 102(e) Date: Mar. 12, 1998

[87] PCT Pub. No.: WO97/11599

PCT Pub. Date: Apr. 3, 1997

[30] Foreign Application Priority Data

Sep. 26, 1995 [GB] United Kingdom ............... 9519639
Mar. 19, 1996 [GB] United Kingdom ............... 9605689
May 29, 1996 [GB] United Kingdom ............... 9611122

[51] Int. Cl.⁷ ............................................. A01M 23/34
[52] U.S. Cl. ............................................. 43/87
[58] Field of Search .................... 43/85, 86, 87

[56] References Cited

U.S. PATENT DOCUMENTS

| 3,060,623 | 10/1962 | Aldrich . | |
|---|---|---|---|
| 3,276,159 | 10/1966 | Robards . | |
| 4,171,589 | 10/1979 | Brownlie | 43/87 |
| 4,581,843 | 4/1986 | Fremont et al. | 43/87 |
| 4,601,128 | 7/1986 | Danison | 43/82 |
| 4,757,639 | 7/1988 | Bertram . | |
| 4,920,690 | 5/1990 | Olecko . | |
| 5,157,863 | 10/1992 | Godwin | 43/87 |
| 5,675,928 | 10/1997 | Tattrie | 43/87 |

FOREIGN PATENT DOCUMENTS

| 1 145 935 | 5/1983 | Canada . |
| 397268 | 6/1932 | United Kingdom . |
| 2 092 422 | 8/1982 | United Kingdom . |

*Primary Examiner*—Jack W. Lavinder
*Attorney, Agent, or Firm*—Lahive & Cockfield, LLP

[57] ABSTRACT

An animal tap consisting an anchored activating spring (16) with detachable safety catch (26), secured by tension to a trigger mechanism (10), and a partable noose (29). The cord of the noose (29) passes through the rings (19 and 21) on the ends of the upper and lower arms (20) and (18) of the spring (16) in a pulley-like arrangement and is fixed to the attachment (22). The noose (29), constructed from soft but bite-resistant materials, incorporates a flat, leg-gripping part (30) containing a reusable, partable catch (31) and a resilient lock (37). When set, the noose (29) overlies the trigger means (14) so that when the latter is trodden on by an animal, the spring (16) is released and, pivoting in the channel (11), raises the noose (29) vertically up the animals leg, simultaneously tightening it. The spring (16) then separates from the trigger mechanism (10) to act as a cushioning spring, automatically releasing animals smaller or more powerful than the target animal.

18 Claims, 10 Drawing Sheets

ANIMAL FOOT TRAP

The invention relates to an animal trap—more particularly to a soft, bite resistant, leg-holding noose, activated, anchored and cushioned by a torsion spring, which is separable from a trigger mechanism. The noose is constructed to rapidly and automatically release non-target species and to enable target animals to escape unharmed if the trap is not checked within a certain time period.

There has been considerable effort in recent years to try and develop traps that capture animals more humanely and selectively than those heretofore available. The present invention is one such effort. It is an improvement on an existing genre of foot snare traps. Such prior art traps include U.S. Pat. No 3,060,623 to ALDRICH: U.S. Pat. No 4,581,843 to FRREMONT: U.S. Pat. No. 5,157,863 to GODWIN: Canadian Patent No 1,145,935 to NOVAK and UK Patent No. 397,268 to PHELPS.

All such traps achieve their objective in a similar way. By catching an animal with a loop round one of its legs and fixing the other end of the snare cable to an anchor point such as a tree, the animal is prevented from running away when it is approached. Target animals may be subsequently destroyed or dealt with in some other appropriate way, whilst non-target animals may be released, either by the trapper or, more desireably, by means that effect an automatic release. The activating springs and triggering mechanisms are predominantly single, combined units that have long metal spikes which, when driven or placed into the ground, keep the whole mechanism stable and parallel to the ground. The snare loop is then set over the trigger means at ground level and the snare cable hooked over the upper, active arm of the spring. The cable is then fixed onto some part of the combined spring and trigger mechanism, before leading off to be firmly secured to an anchor point. When the trigger means is trodden on by an animal, the upper arm of the spring is released and, as it flies back, the snare is pulled tight around the animals leg and kept tight by means of a "lock". As the animal struggles to get free, it uproots the combined spring and trigger mechanism and is then connected directly and firmly to the snare anchor.

The main failings of these traps are that they all inflict physical pain on the animals they capture. The bare-wire snare cable can sometimes cause serious damage to the animals leg and "jarring" injuries can be sustained as the animal lunges against the firmly anchored cable. Any attempt by the animal to chew through the wire can cause permanent damage to its teeth and the uprooted spring and trigger mechanism can also inflict injuries as the animal thrashes about. Some efforts have been made to pad the leg-holding part of the snare with rubber tubing, but this has limited effect, and a variety of cushioning springs may be inserted along the cable, with varying degrees of effectiveness, to reduce jarring injuries—the "Freemont" trap for example uses the activating spring for this purpose, but with the heavy, cumbersome and potentially injurious trigger mechanism still attached to it. "End-Rivets", securing the cable to the lock plate, can be provided to "pop off" and release animals larger or more powerful than the target animal, but these require considerable force to be applied directly to the animals leg, before the rivets will part, causing considerable pain and even injury to the animal, before releasing it—and also prevents further use of the snare. Because the combined activating spring and trigger mechanism is anchored parallel to the ground, the spring always flies back, away from the animals leg, frequently resulting in the snare being pulled out from under the animals foot, thereby failing to catch it. The arms of the activating spring also have to be quite long in order to tighten a large enough snare loop, making the trap difficult to conceal and the combined spring and trigger mechanism, being long and angular, make the trap awkward to carry and store.

The invention seeks to provide an animal foot trap that will be more humane, efficient, selective and versatile. It will also be faster, smaller, lighter and easyer to carry and store.

In accordance with the invention this object is accomplished in an animal foot trap comprising:

a spring comprising a central coiled portion from which extend first and second arms operating in a substantially vertical plane, the end of each said arm being formed into closed loops bent towards each other in said vertical plane such that when compressed together, said arms lie generally parallel to each other so said loops overlap to define a conduit and when relaxed, said arms extend at a wide angle;

a detachable safety catch;

a cord having a first end fixed to one of said arms, passing through and between each of said closed loops in a pulley-like arrangement and formed at the second end into a noose;

a trigger mechanism adapted to securely retain the compressed said spring and to release it when triggered; and     an anchor means attached to said spring and adapted to hold it firmly with respect to the terrain.

An animal foot trap formed in accordance with the invention has a number of advantages. When triggered by an animal, the short, double-action, activating spring raises a noose straight up the animals leg, tightening it very rapidly. The noose cord, being made from soft, bite-resistant, but dentally non-damaging materials and treated with a taste-repellant chemical, inflicts no physical injury or pain on the animal. The use of a resilient lock allows the noose to relax its grip slightly when the animal stops struggling and the noose is constructed both to limit the extent of its closure and to part if force just greater than can be exerted by a target animal is applied, thereby automatically releasing animals smaller or more powerful than the target animal. A partable catch also allows the noose to be re-set when parted. Because the spring separates from the trigger mechanism to function as a cushioning spring, the weight of this unit is significantly reduced, resulting in less stress to the animal and leaving the potentially injurious trigger mechanism safely in the ground. By incorporating a detachable safety catch, the spring is also prevented from snagging in undergrowth. The noose cord can eventually be severed by determined chewing, allowing target animals to escape unharmed if the trap is not checked within a certain time period. The trap allows the interchangeable use of non-partable soft nooses as well as partable and non-partable metal snares. As the spring and trigger mechanism are separable, the trap is also easyer to carry and store.

The invention will now be described by way of example and with reference to the accompanying drawings in which.

Figure 1:
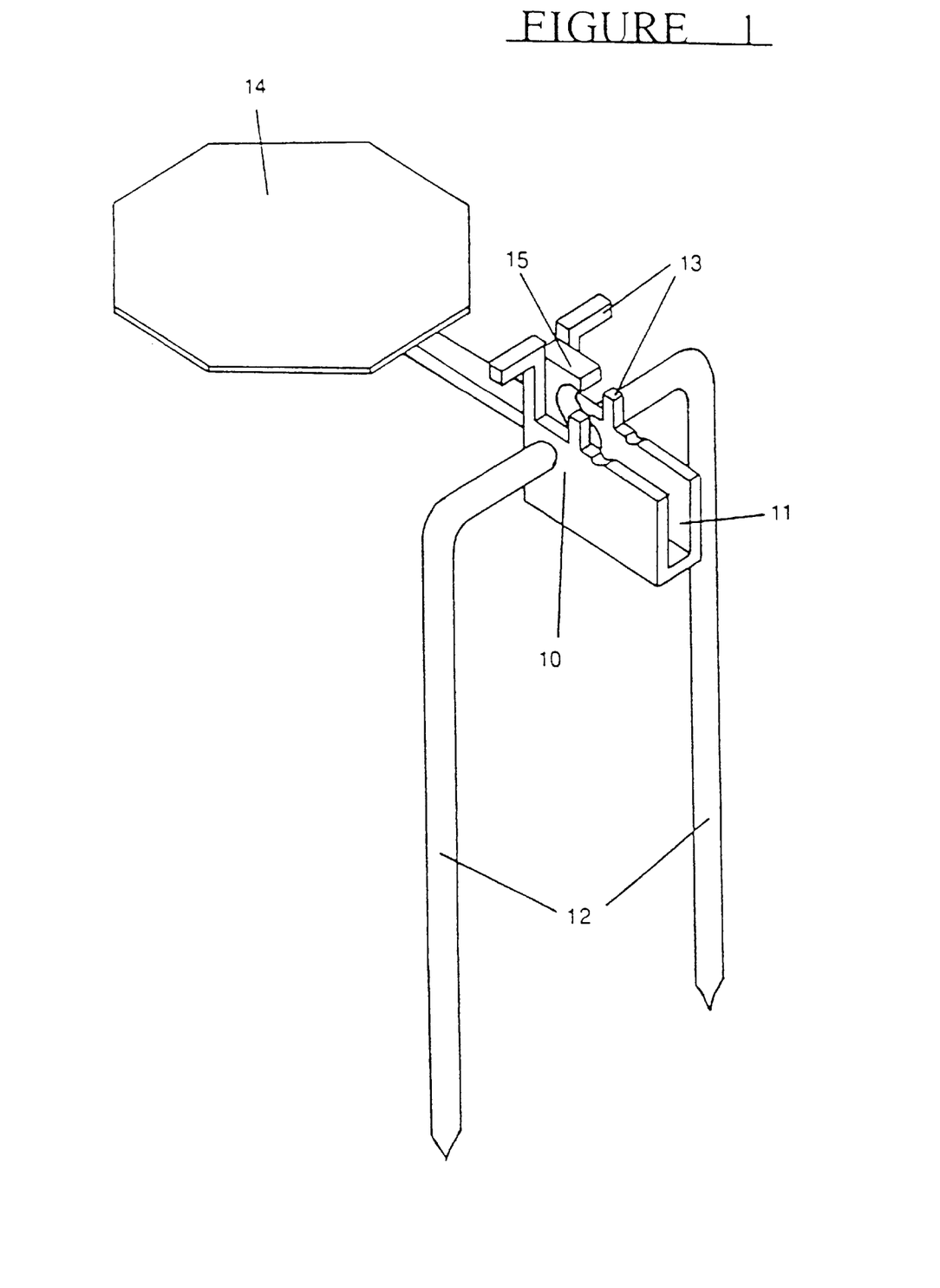
FIG. 1 shows a trigger mechanism.
Figure 2:
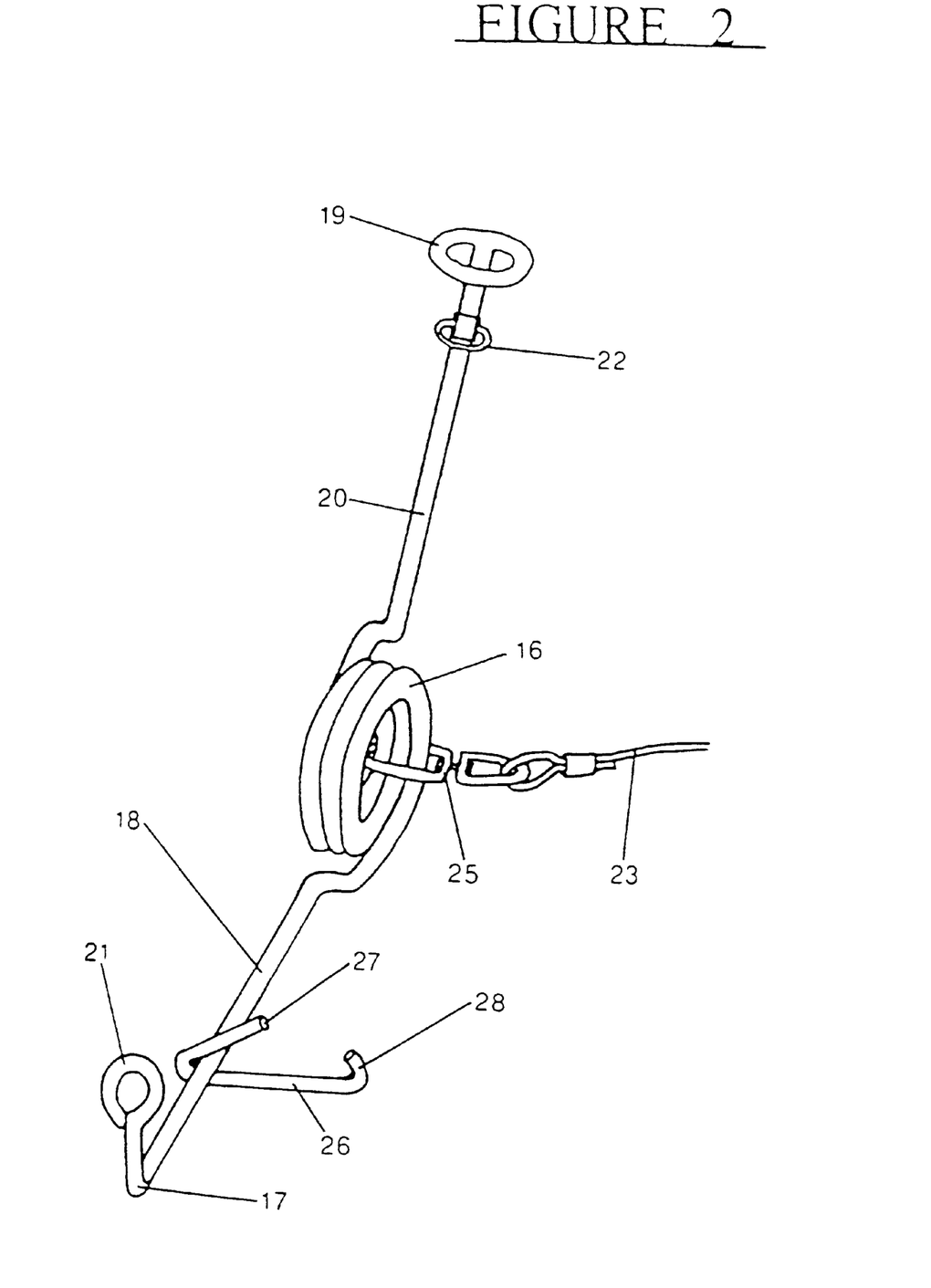
FIG. 2 shows a spring in the relaxed and separated position with a detachable safety catch.
Figure 9:
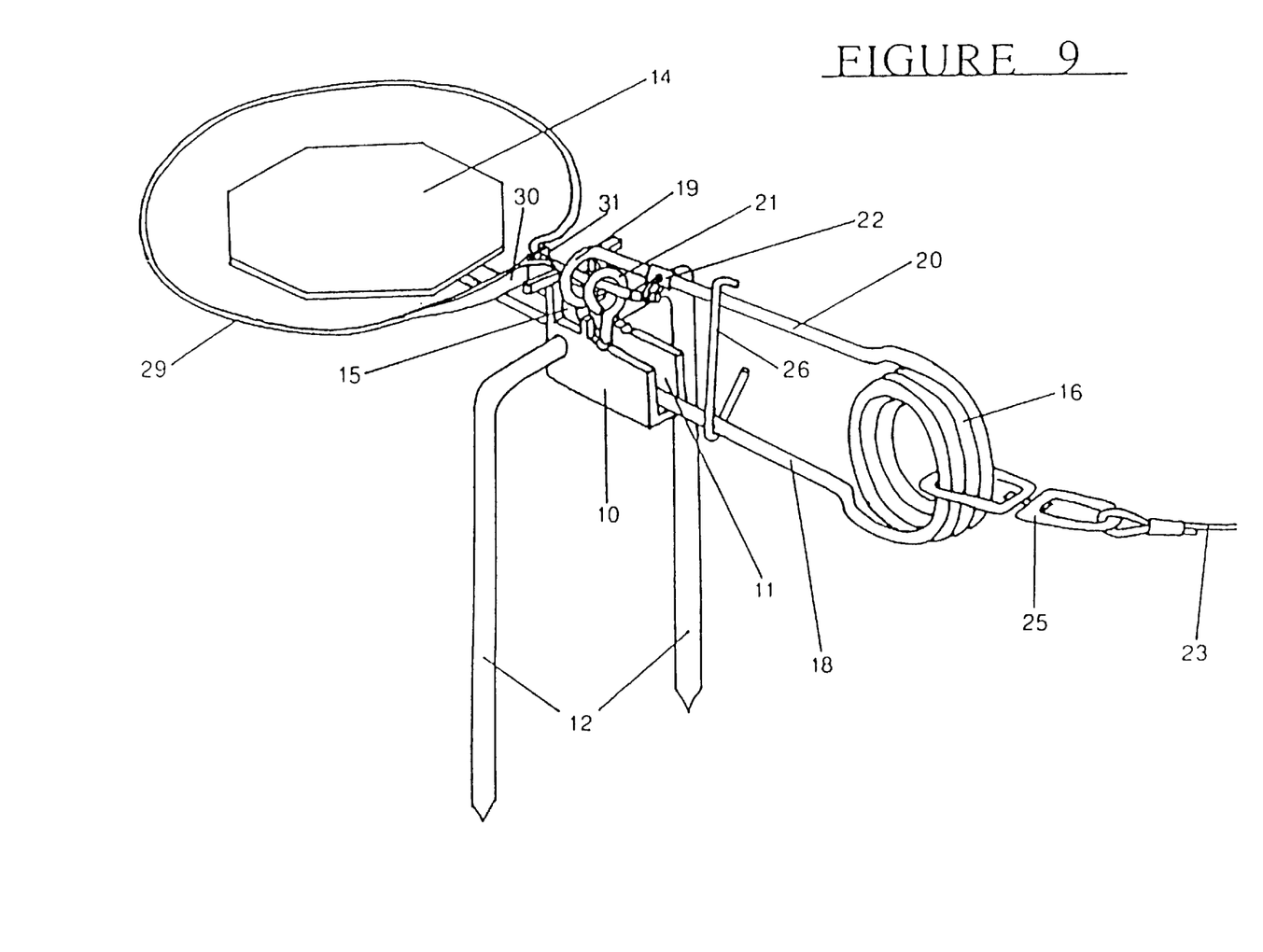
FIG. 9 shows a trap assembled with a noose in position.
Figure 10:
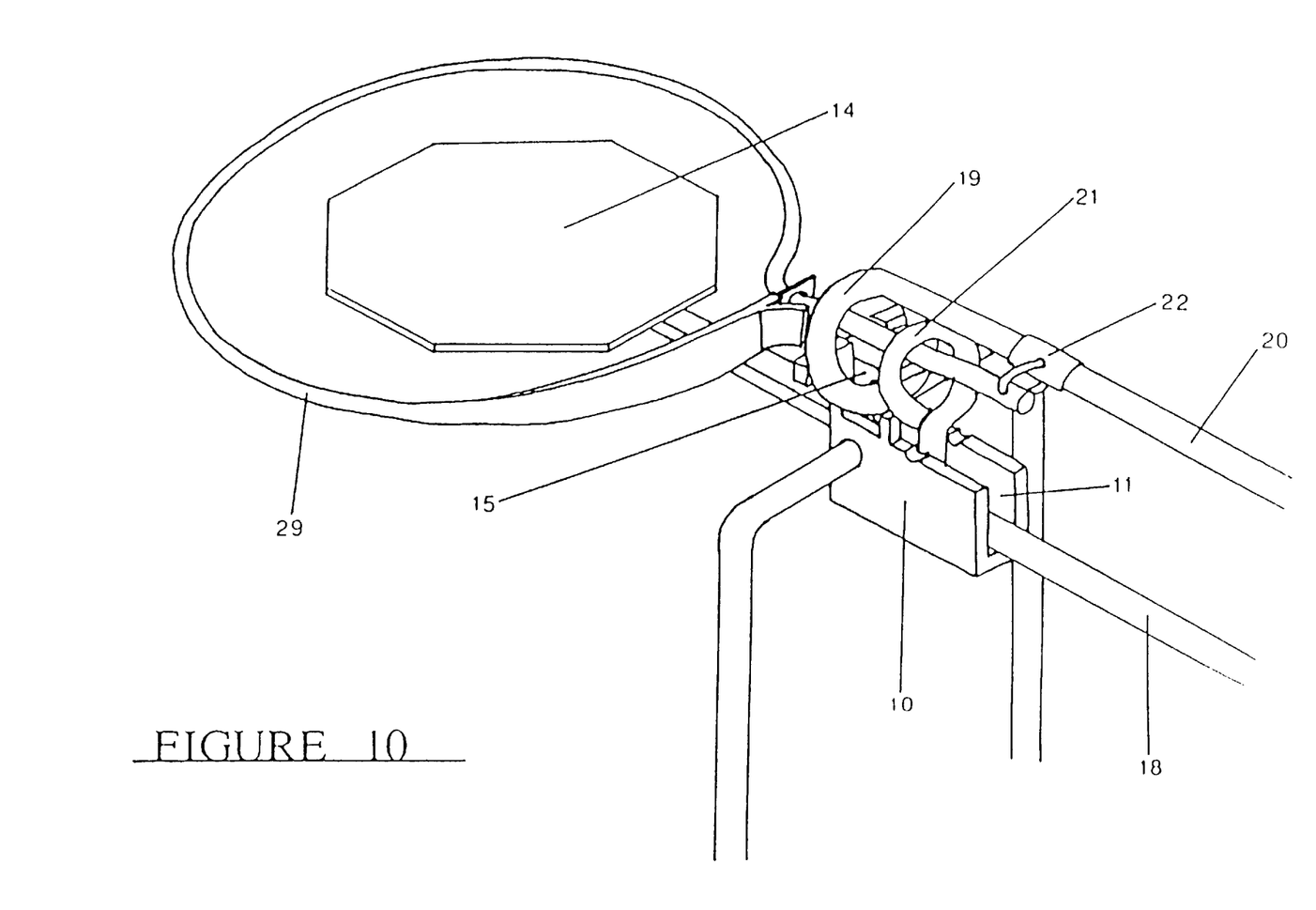
FIG. 10 shows an enlarged view of the spring, trigger mechanism and noose assembly.
Figure 11:
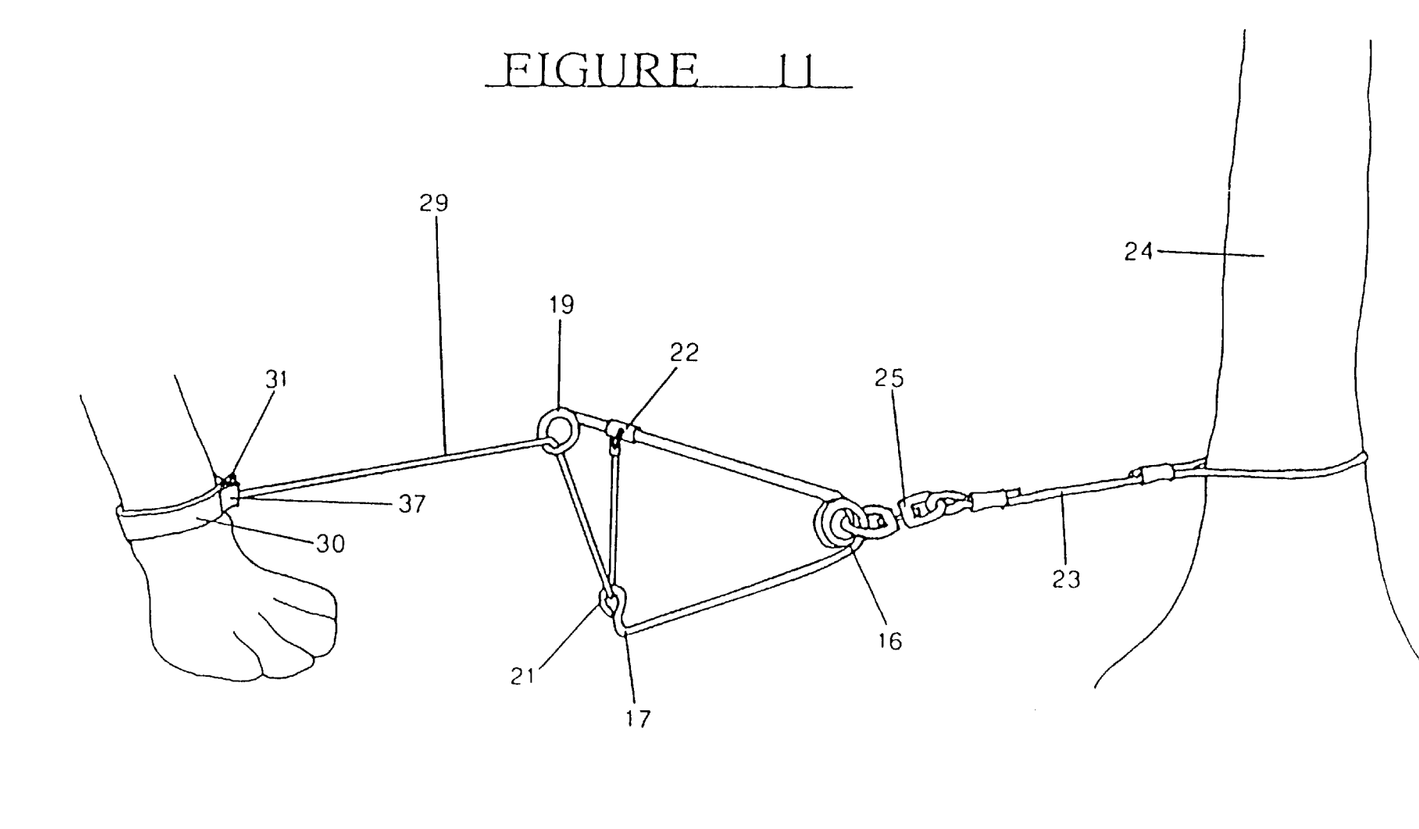

FIG. 11 shows the triggered spring fixed to its anchor and acting as a cushioning spring, with an animals foot caught in a noose The trigger mechanism (10) as shown in FIG. 1 comprises a channel (11) shaped to receive as shown in FIG. 2 the bend (17) in the lower arm (18) of the spring (16) so as to prevent any lateral movement, and a pair of spikes (12) as a means to anchor the trigger mechanism securely into the ground. The appendages (13) are shaped to receive the ring (19) on the end of the upper arm (20) of the spring and prevent it from moving forwards or rearwards. The trigger plate (14) is firmly attached to the trigger hook (15) which catches onto the ring (19) when the trap is set as shown in FIGS. 9 and 10, and releases it when the trigger plate (14) is depressed. This allows the ring (21) on the end of the lower arm (18) to be positioned adjacent to the ring (19) on the end of the upper arm (20) when the trap is set. The free end of a partable slip-noose (29)—or alternatively (39), (43), (48), or (57)—as shown in FIGS. 3, 5, 6, 7 & 8 then passes through both of the rings (19) and (21) to be securely fixed to an attachment (22), or to the ring (19), on the upper arm (20) of the spring. When the trap is set and an animal treads on the trigger plate (14), the ring (19) is released from the trigger hook (15) and the two arms (18) and (20) recoil rapidly away from each other, pivoting on the bend (17), in the channel (11). As the upper ring (19) rises vertically, it not only lifts the leg-holding part (35) of the noose straight up the animals leg and tightens it, the attachment (22) also simultaneously pulls the other end of the noose cord (29) through the lower ring (21), thereby increasing both the speed and length of noose cord drawn through the ring (19) and allows for a shorter spring to be used for a standard length of noose cord—or a longer noose cord for a standard length of spring. When the spring (16) reaches the end of its activating action, the bend (17) in the lower arm (18) disengages from the channel (11), thereby separating the spring (16) from the trigger mechanism (10). Attached to the spring (16) is a connector (23) securely joining it to an anchor point (24) as shown in FIG. 11 and may include a link-swivel (25) anywhere along its length. A detachable safety catch (26) as shown in FIG. 2 may be used when setting the trap and is formed from a length of metal rod bent at both ends to have a long hook (27) and a short hook (28). In use, the long hook (27) is placed under the lower arm (18) and the short hook (28) rested over the upper arm (20), when the trap is set. This sequence is reversed to remove the safety catch (26). The spring (16), being securely attached to the anchor point (24), now acts as a lightweight cushioning spring as shown in FIG. 11, absorbing any struggles the animal may make, while the trigger mechanism (10) is left safely in the ground. Because the safety catch (26) is detachable, it does not snag in undergrowth at this stage, as it would if permenantly fixed to any part of the spring (16). The pulley-like action allows the spring (16) to be strong and fast in its activating mode, yet soft and "long" in its cushioning mode. The noose cord (29) may be doubled back between the upper and lower rings (19) and (21) any number of times before being fixed to either arm (18) or (20), or may pass through the upper ring (19) to be fixed directly to the lower ring (21), or lower arm (18), allowing a longer spring to be used, where appropriate.

Figure 3:
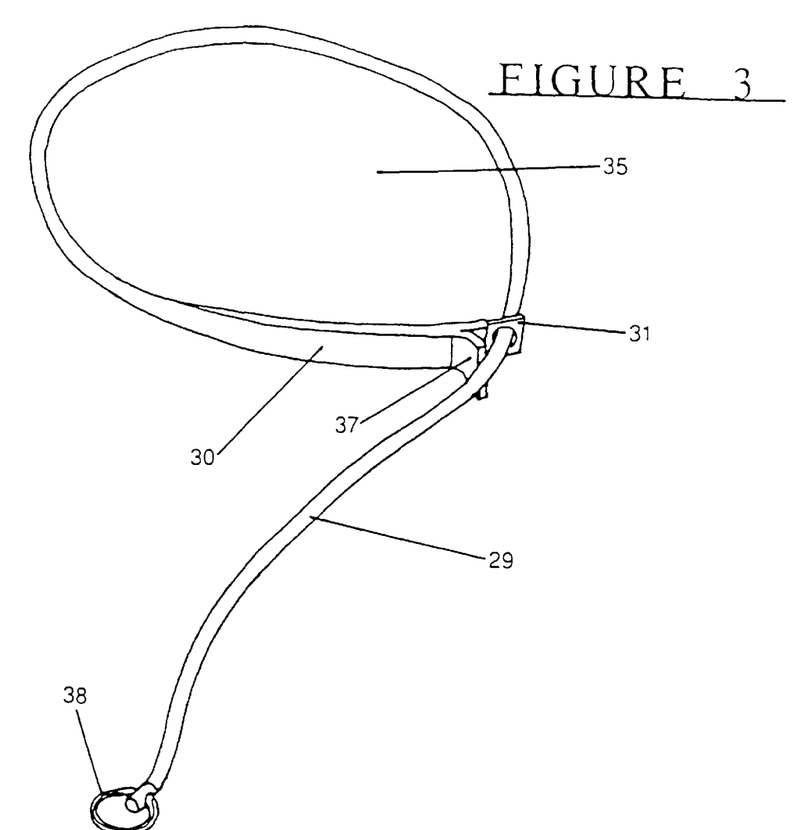
FIG. 3 shows a noose with a re-settable, partable catch and a resilient lock.
Figure 4:
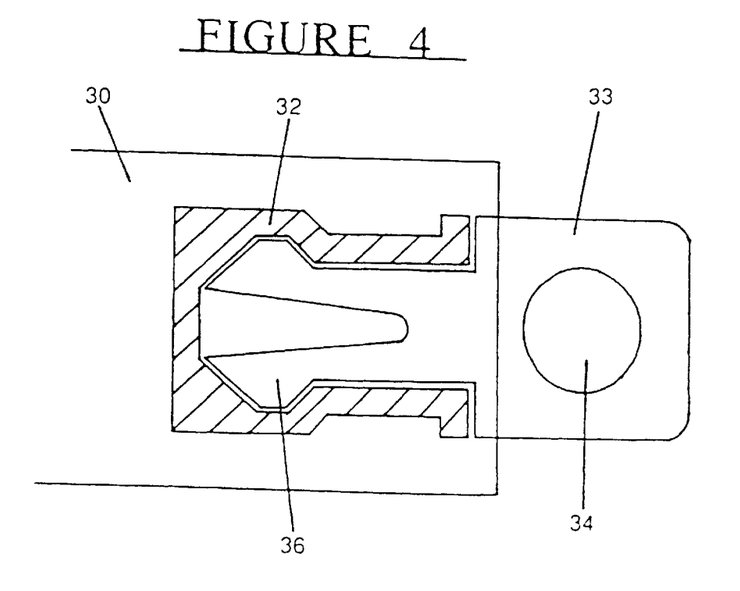
FIG. 4 shows a detailed elevation of a re-settable, partable catch.

A partable noose (29)—or alternatively (39), (43), (48), or (57)—as shown in FIGS. 3, 5, 6, 7 & 8, is constructed from long, tough, non-resilient fibres—e.g. Kevlar—interfilled with a tough, resilient matrix—e.g. high tensile rubber. The fibres and/or the matrix are treated with a taste repellent chemical—e.g. "Bitrex"—so as to deter animals from chewing it. The resulting cord is strong and non-resilient when pulled longitudinally, but soft, flexible, resilient and tough when compressed laterally. Varying the diameter and relative composition of the cord results in a means to adjust the time required for a determined target animal to chew through it. The noose (29) as shown in FIG. 3 is formed by the part (30), that surrounds and grips the animals leg, being flattened and widened to offer a larger surface area and to accomodate a re-usable, partable catch (31). The catch (31) as shown in FIG. 4 comprises a female part (32) firmly fixed inside the part (30) and a male part (33) that has a hole (34) to allow the cord of noose (29) to pass freely through it, thereby forming the leg-holding loop (35), and a part (36) that fits into the female part (32) to be retained untill pulled by a force just greater than can be exerted by a target animal. The catch may also be formed where the male and female roles are reversed. A resilient appendage (37) as shown in FIG. 3 protrudes from the outer end of the leg-gripping part (30) so as to flex when the cord is pulled through the hole (34), in the act of tightening the noose, but "gives" a little before jamming the cord against the male part (33), when pulled in the opposite direction. This ensures the noose relaxes slightly around the animals leg before the lock takes effect, thereby maintaining a flow of blood to the animals foot. The cord is releaseably fixed to the spring attachment (22) e.g. by means of a split ring (38).

Figure 5:
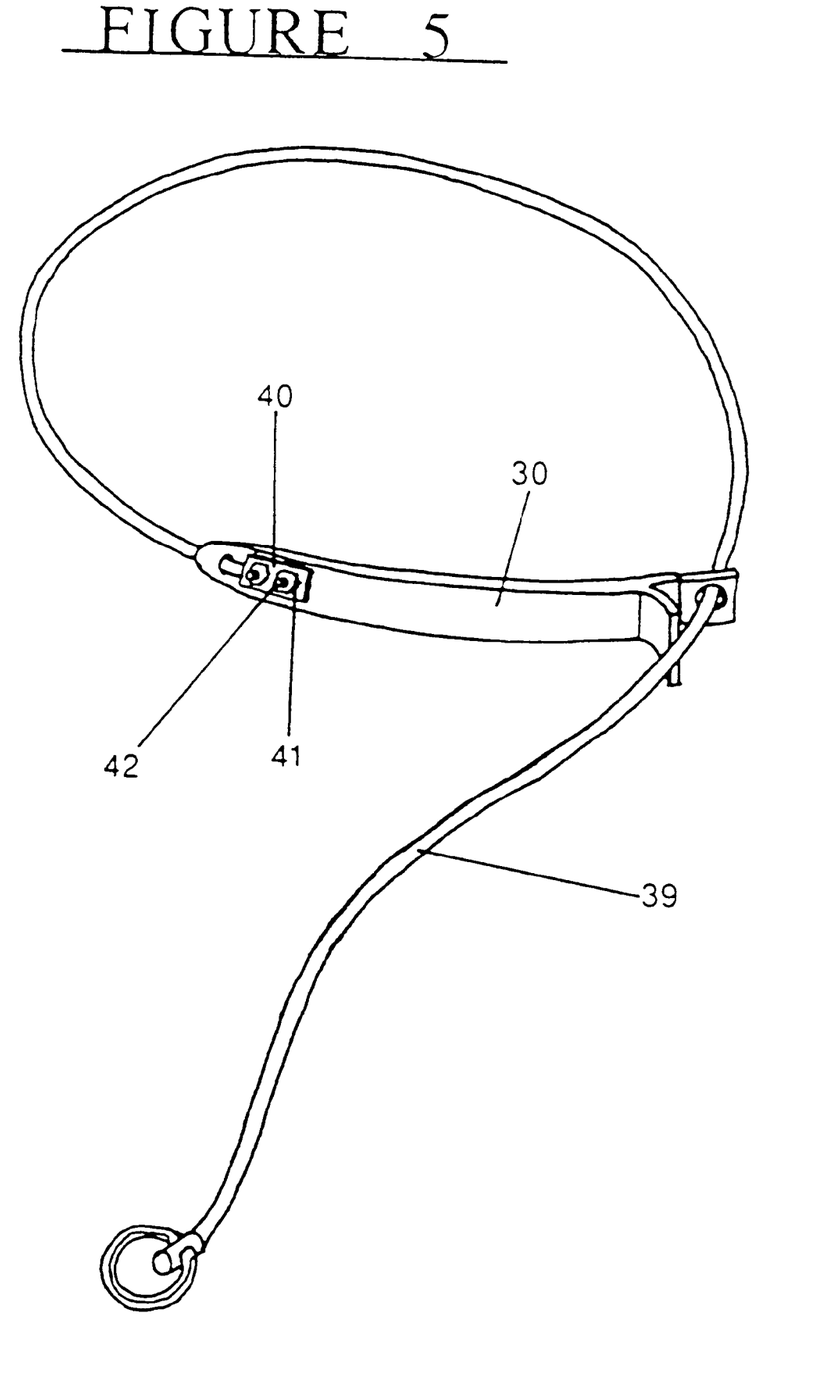
FIG. 5 shows an alternative partable noose where the leg holding part is detachable from the rest of the cord.

An alternative embodiment of the noose as shown in FIG. 5 has the leg-gripping part (30) releaseably attached to the cord (39), e.g. by means of the attachment plate (40) on the end of the cord (39) being fixed by nuts (41) to bolts (42) firmly fixed into the leg-gripping part (30).

Figure 6:
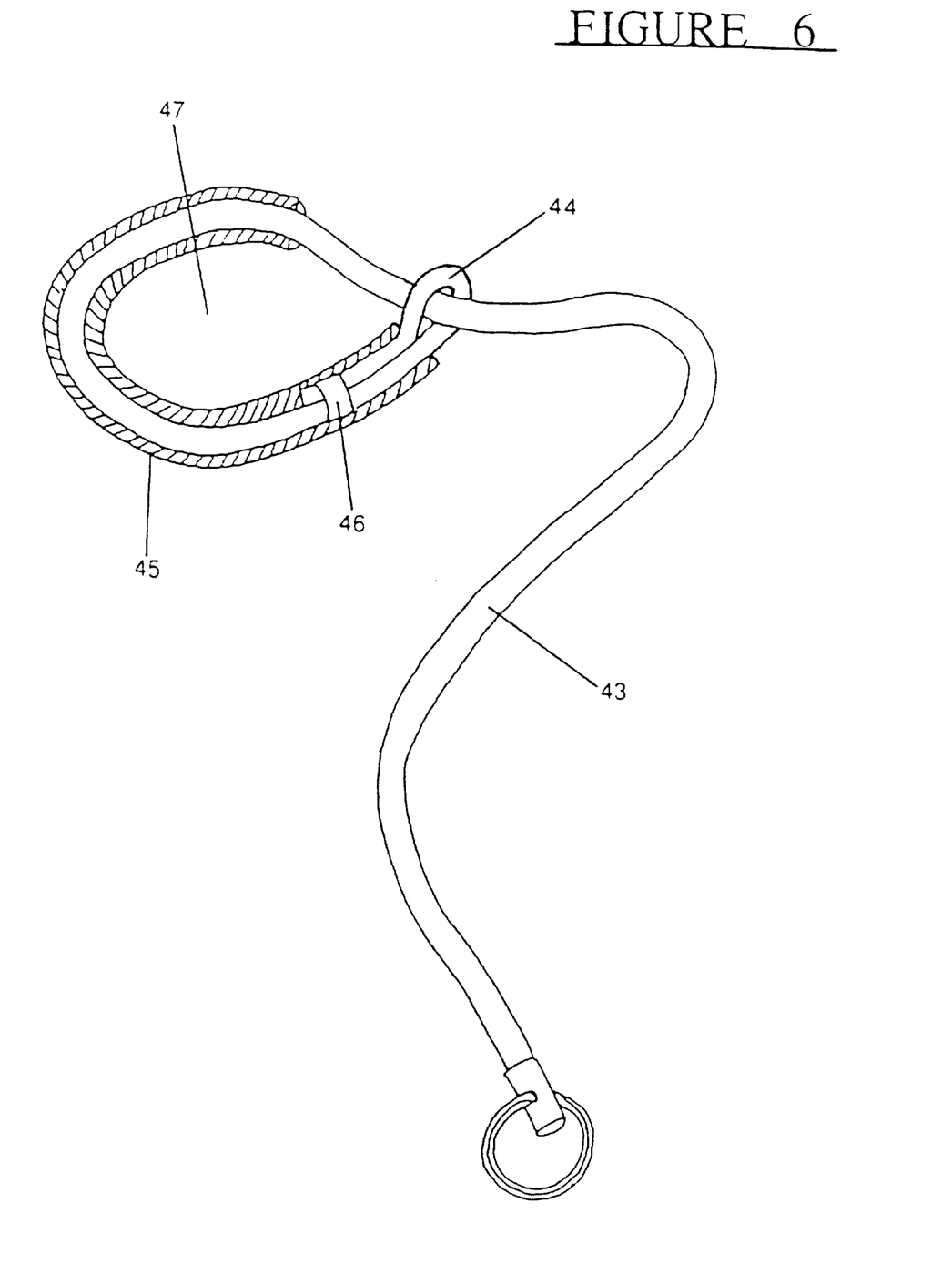
FIG. 6 shows another alternative partable noose.

An alternative partable noose (43) as shown in FIG. 6 comprises a loop (44) formed at one end of a length of cord and held together by a surround of padding (45) and/or a clip (46), glue, or any other means that will allow the cord to pass through the loop (44) to form the leg-holding part (47) of the noose, but to come apart if a force just greater than can be exerted by a target animal is applied.

Figure 7:
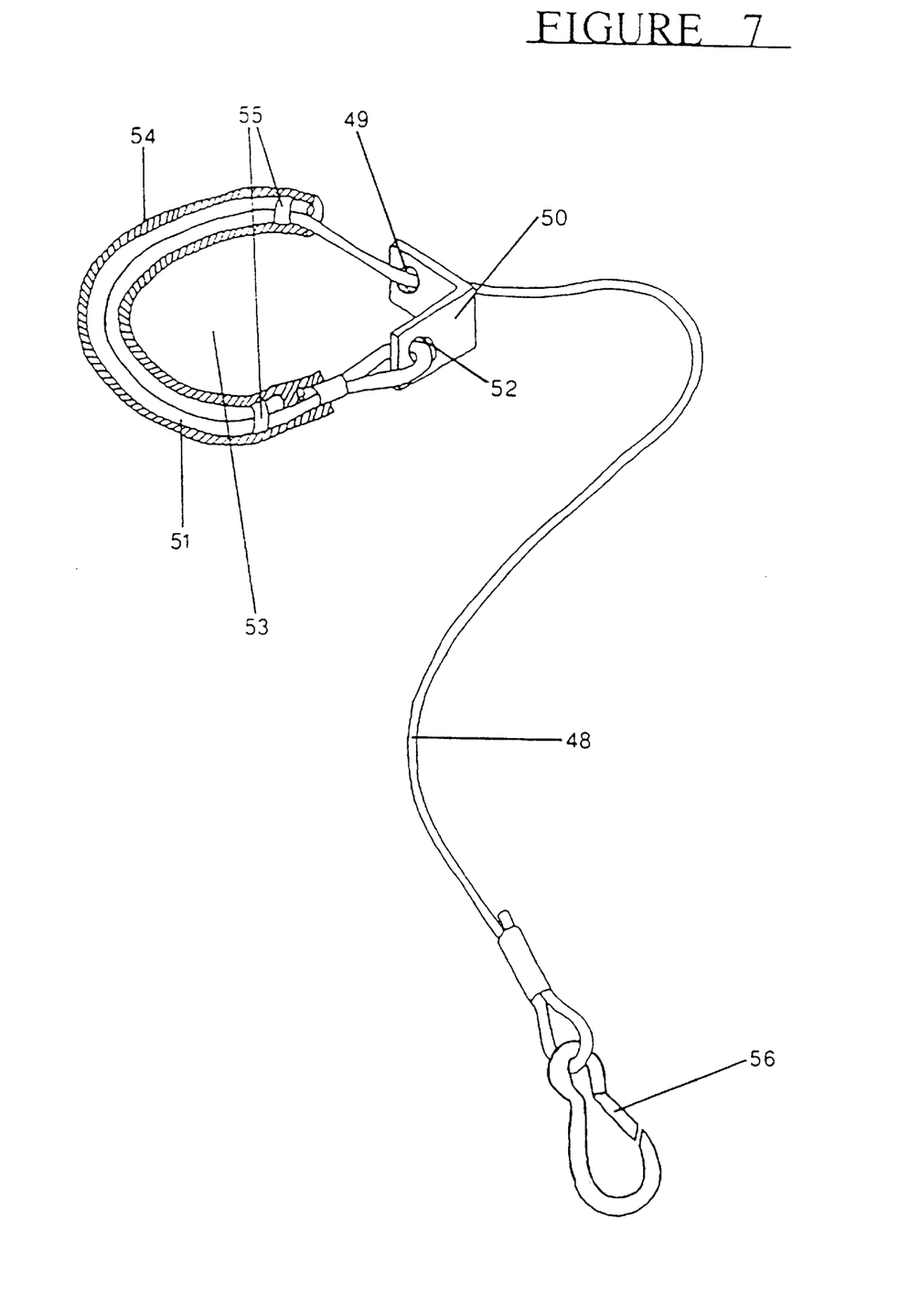
FIG. 7 shows another alternative partable noose.

Another alternative partable noose (48) as shown in FIG. 7 comprises a length of cord passing through a hole (49) in one side of a lock plate (50) and lying alongside a shorter length of cord (51) securely attached to the other side (52) of the lock plate (50). The two cords (48) and (51) are held together to form the leg-holding loop (53) of the noose by a surround of padding (54) and/or clips (55), glue, or any other means that will allow the two cords (48) and (51) to slip past each other and separate if a force just greater than can be exerted by a target animal is applied. The noose cord (48) is releaseably fixed to the spring attachment (22) e.g. by means of a snap-link (56).

Figure 8:
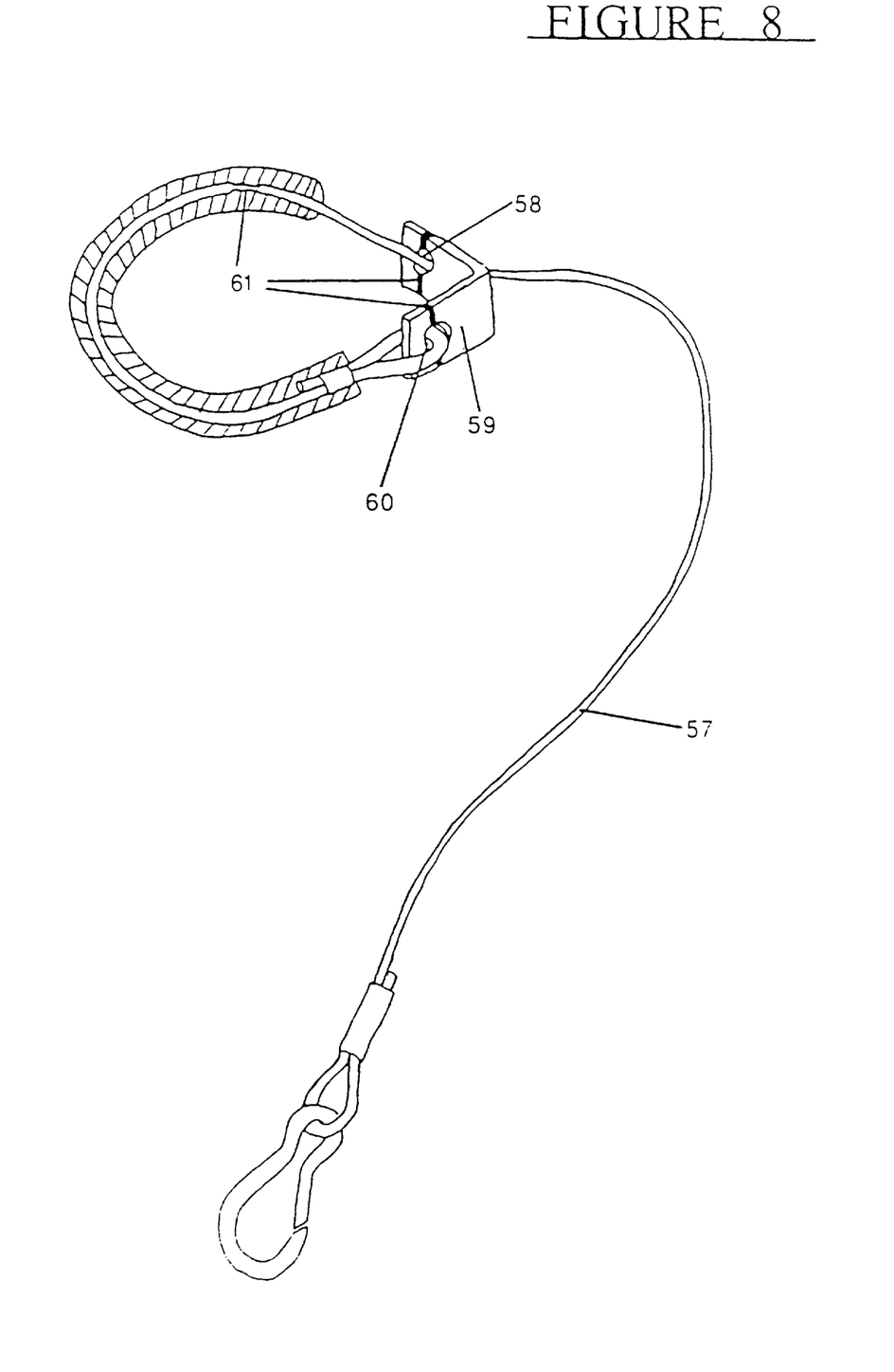
FIG. 8 shows another alternative partable noose.

Another alternative partable noose (57) as shown in FIG. 8 comprises a length of cord passing through a hole (58) in one side of a lock plate (59) and circling round to be firmly fixed to the other end (60) of the lock plate (59), in the traditional, non-partable manner. In this embodiment however, the lock plate (59) and/or the leg-holding section of the cord is structurally weakened at any point e.g. (61) so that it will break apart if a force just greater than can be exerted by a target animal is applied.

Any feature, or combination of features, may be used to provide a noose whose holding loop will part if a force just greater than can be exerted by a target animal is applied.

The noose is adjusted so as to part if an animal more powerful than the target animal is caught.

Non-partable soft nooses aswell as partable and non-partable metal snares may also be used with this trap.

All springs, trigger mechanisms and nooses can be individually exchanged.

I claim:

1. An animal trap comprising:

a spring including a central coiled portion from which extend first and second arms operating in a substantially vertical plane, the end of each said arm being formed into closed loops bent towards each other in said vertical plane, such that when compressed together said arms lie generally parallel to each other so said loops overlap to define a conduit, and when relaxed said arms extend at a wide angle;

a detachable safety catch;

a cord having a first end fixed to one of said arms, passing through and between each of said closed loops in a pulley-like arrangement and formed at its second end into a noose;

a trigger mechanism adapted to securely retain said spring in its compressed state and to separate therefrom when triggered; and an anchor means attached to said spring and adapted to hold it firmly with respect to the terrain.

2. An animal trap according to claim 1 wherein the anchor means is attached to the spring at the central coiled portion.

3. An animal trap according to claim 1 wherein the detachable safety catch comprises a length of metal rod having a long-armed hook at the first end and a short-armed hook at the second end.

4. An animal trap according to claim 1 wherein the cord is formed of bite-resistant but dentally non-damaging materials.

5. An animal trap according to claim 1 wherein the noose is treated with a taste-repellant chemical.

6. An animal trap according to claim 1 wherein the noose comprises leg-gripping portion which is flattened with respect to the cord.

7. An animal trap according to claim 1 wherein the tightened noose, when relaxed, automatically loosens before being jammed by a lock.

8. An animal trap according to claim 7 wherein said lock comprises a resilient, valve-like flap.

9. An animal trap according to claim 1 wherein the noose comprises a leg-gripping portion which is separable from the noose cord.

10. An animal trap according to claim 1 wherein the noose if formed with non end-rivet means is adapted to part when pulled by a force greater than that exerted by a first target animal but less than that exerted by a second non-target animal.

11. An animal trap according to claim 1 wherein the noose is partable by means of a re-usable, partable catch.

12. An animal trap according to claim 11 wherein said catch comprises a male portion slideably retaining therethrough said noose cord, and a female portion securely fixed to one end of said cord and securely retaining said male portion until pulled by a force greater than that exerted by a first target animal but less than that exerted by a second non-target animal.

13. An animal trap according to claim 11 wherein said catch comprises a female portion slideably retaining therethrough said noose cord, and a male portion securely fixed to one end of said cord and securely retained by said female portion until pulled by a force greater than that exerted by a first target animal but less than that exerted by a second non-target animal.

14. An animal trap according to claim 1 wherein said noose is formed of a folded loop having a free end, the free end of said loop being attached to the remainder of the cord by enclosure of both within a binding such that the noose is adapted to part when pulled by a force greater than that exerted by a first target animal but less than that exerted by a second non-target animal.

15. An animal trap according to claim 1 wherein the noose is formed of two cords, connected end to end by enclosure of both within a binding, one of said cords having a free end that is slideably attached to the other cord, thereby to ensure that the noose parts when pulled by a force greater than that exerted by a first target animal but less than that exerted by a second non-target animal.

16. An animal trap according to claim 1 wherein the noose is partable by a slideable noose lock plate being structurally weakened thereby to allow said lock plate to break apart when pulled by a force greater than that exerted by a first target animal but less than that exerted by a second non-target animal.

17. An animal trap according to claim 1 wherein the noose is constructed from snare cable.

18. An animal trap according to claim 1 wherein the noose is non-partable.

* * * * *